US005509992A

United States Patent [19]

Axelrod

[11] Patent Number: 5,509,992

[45] Date of Patent: Apr. 23, 1996

[54] METHOD OF MANUFACTURING A LITHOGRAPHICALLY PRINTED PRODUCT

[76] Inventor: Herbert R. Axelrod, One T.F.H. Plz., Neptune, N.J. 07753

[21] Appl. No.: 294,423

[22] Filed: Aug. 23, 1994

Related U.S. Application Data

[60] Continuation of Ser. No. 83,083, Jun. 25, 1993, which is a division of Ser. No. 762,394, Sep. 18, 1991, Pat. No. 5,249,828.

[51] Int. Cl.[6] .......... B32B 31/00

[52] U.S. Cl. .......... 156/277; 283/108; 283/109; 283/110; 283/112; 101/128.21; 40/360; 40/626; 40/630

[58] Field of Search .......... 283/107, 108, 283/109, 110, 112; 156/277; 427/265, 282; 101/128.21; 40/630, 626, 360, 158.1, 159.2

[56] References Cited

U.S. PATENT DOCUMENTS

| | | | |
|---|---|---|---|
| 3,096,014 | 7/1963 | Swan | 427/265 X |
| 3,512,286 | 5/1970 | Siegel | 283/109 |
| 3,759,610 | 9/1973 | McVittie | 355/17 |
| 4,317,626 | 3/1982 | Poshkus | 283/112 X |
| 4,467,335 | 8/1984 | Schmidt et al. | 156/277 X |
| 4,687,526 | 8/1987 | Wilfert | 283/108 X |
| 4,721,635 | 1/1988 | Helinski | 156/277 |
| 4,869,921 | 9/1989 | Gabel et al. | 427/265 X |
| 4,928,996 | 5/1990 | Oshikoshi et al. | 283/109 |
| 5,161,827 | 11/1992 | Grosso | 40/158.1 X |
| 5,165,967 | 11/1992 | Theno et al. | 427/265 X |

FOREIGN PATENT DOCUMENTS

| | | | |
|---|---|---|---|
| 2901374 | 7/1979 | Germany | 40/360 |
| 0110380 | 6/1985 | Japan | 427/282 |
| 2208141 | 3/1989 | United Kingdom | 283/107 |
| 8000818 | 5/1980 | WIPO | 40/630 |

*Primary Examiner*—David A. Simmons
*Assistant Examiner*—Steven J. Helmer
*Attorney, Agent, or Firm*—Fulwider Patton Lee & Utecht

[57] ABSTRACT

A method of making a printed product comprising a photographic print on a substrate, a border printed on the substrate around the print and a transparent film coated on the substrate, overlying and in registry with the print.

1 Claim, 2 Drawing Sheets

METHOD OF MANUFACTURING A LITHOGRAPHICALLY PRINTED PRODUCT

This is a continuation of copending application(s) Ser. No. 08/083,083 filed on 6/25/93, which is a divisional of Ser. No. 07/762,394 filed 9/18/91 (now U.S. Pat. No. 5,249,828 issued 10/5/93).

This invention relates to a printed product as a new article of manufacture.

In another respect the invention relates to a method for manufacturing such product.

According to another aspect the invention pertains to a page of a book or the like which carries a photograph print produced by lithography or other technique for printing photographs, the page being manufactured in such a way that the photographic print is highlighted and has enhanced aesthetic qualities.

Pages of high quality books, brochures and the like are commonly manufactured by lithography or other conventional techniques which reproduce texts and photographic images by applying inks to the paper substrate. Typically the finish or texture of the printed photographic images and the printed words are similar, such that the printed photographic image is often "flat" or understated in comparison to the original photograph from which it was reproduced. It would be desirable to provide a printed product and method of manufacture in which the photographic image has a different or enhanced appearance or texture in comparison with the remainder of the substrate and the remainder of the printing on the page. Additionally, in certain instances it would be desirable to provide a "custom" or "limited edition" effect by providing a printed product which gives the impression of a conventional photograph adhesively secured to the page rather than being printed on the page by lithography.

Accordingly, the principal object of the present invention is to provide a new article of manufacture which is a printed product having a photographic print with enhanced visual appeal, contrast, texture, etc. in comparison with the remainder of the page.

Yet another object of the invention is to provide a printed product which has an enhanced "custom" or "limited edition" appearance.

This and other, further and more specific objects and advantages of the invention will be apparent to those skilled in the art from the following detailed description thereof, taken in conjunction with the drawings, in which.

Briefly, in accordance with the invention, I provide a new article of manufacture and a new method for manufacturing this product. The article of manufacture is a printed product which comprises a substrate, a photograph print on the substrate, a border printed on the substrate around the print and a transparent coating on the substrate, overlying and in registry with the photographic print.

The method for manufacturing this product comprises the steps of printing a photograph print on the substrate, printing a border on the substrate around the print and applying a transparent coating on the substrate in registry with the print.

Figure 1:
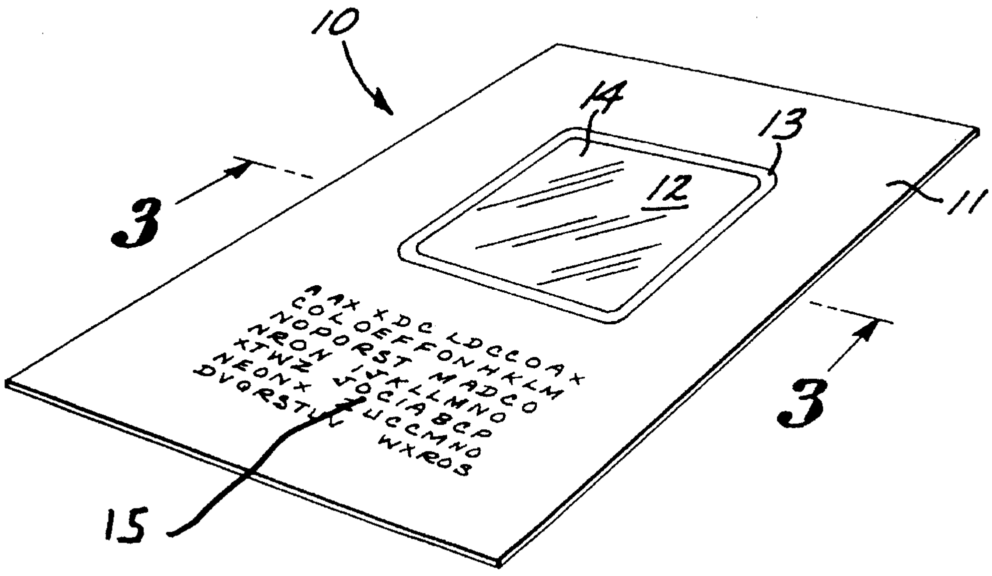
FIG. 1 is a perspective view of a printed page carrying a photographic print as well as text material, manufactured in accordance with the principles of the present invention.
Figure 2:
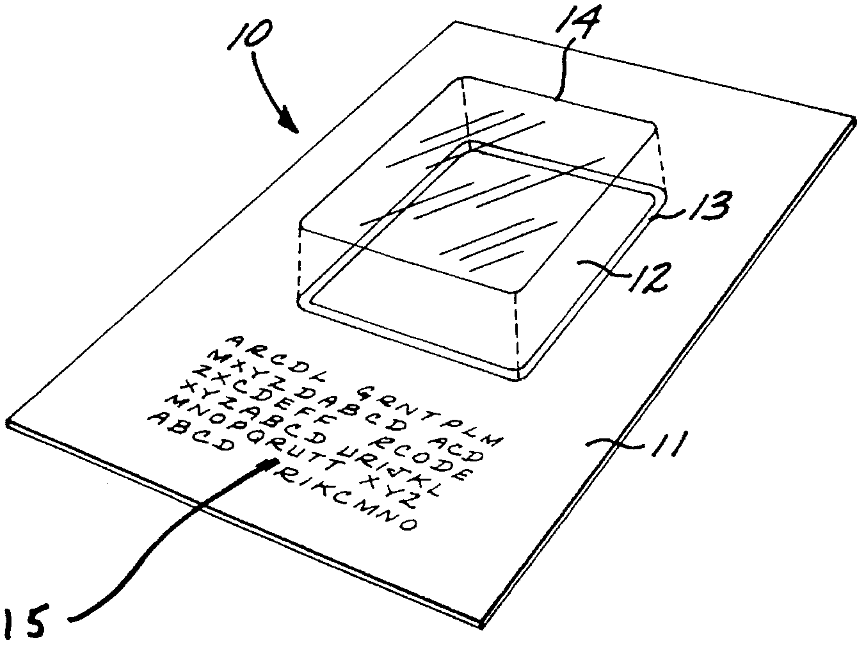
FIG. 2 is a partially exploded perspective view of the printed page of FIG. 1.
Figure 3:
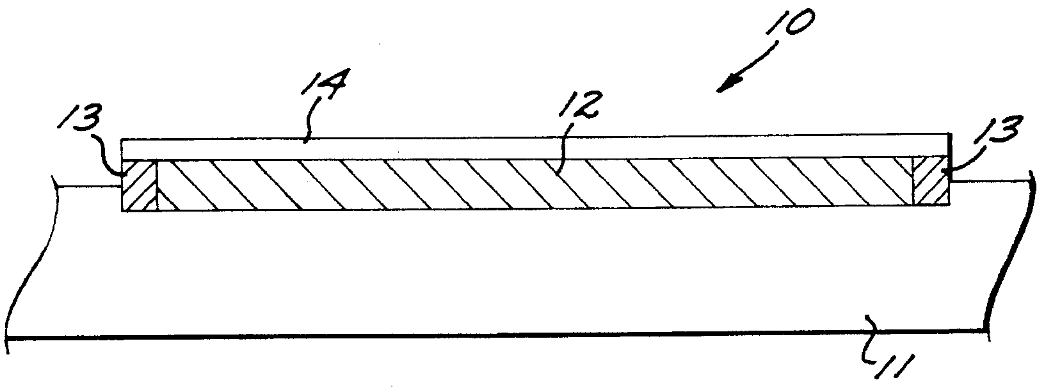
FIG. 3 is a sectional view of the product of FIG. 1 taken along section line 3—3 thereof.

Referring now to the drawings, in which like reference characters depict the same elements in the several views, FIGS. 1–3 depict a typical page 10 of a book, brochure or similar product, comprising a substrate 11, a photograph 12, printed on the substrate 11, by lithography or any other suitable means for reproducing photographs by printing inks, a border 13 printed on the substrate around the periphery of the photographic print 12 and a transparent film 14 laminated to the substrate 11 in the area in registry with the print 12 as indicated, the page 11 may optionally carry printed words or other indicia along with the photograph 12.

In the preferred embodiment of the invention the photographic print 12 and border 13 as well as any optional printing 15 are printed on the substrate 11 by conventional lithography. The exact chemical nature, thickness and method of application of the transparent film 14 is not critical. In the presently preferred embodiment I apply a clear varnish product comprising acrylated polymers, prepolymers and multi-functional polyol acrylates available from Sun Chemical Corporation as "RC88-1131" varnish. This varnish product is a liquid which cures to a glossy transparent film under ultra violet light. The laminate product is prepared by applying the acrylate liquid to the substrate 11 in registry with the print 12 by using a silk screen press. After application of the acrylate coating varnish with the silk screen press, the page 10 is then subjected to U.V. radiation to cure the acrylate liquid and produce the clear film 14 overlying and in registry with the print 12.

In the preferred embodiment the border 13 is printed in a "dull" or "matte" finish ink. The principal function of the border is to minimize irregularities in registration of the film 14 and the print 12. Also, the border, in combination with the film 14 enhances the visual impression of the product as being a conventional photograph adhesively secured to a substrate. Further, particularly when the film 14 is formulated to yield a high gloss surface, the border 13 and film 14 often provide or simulate a three-dimensional effect for the photographic image of the print 12.

Figure 4:
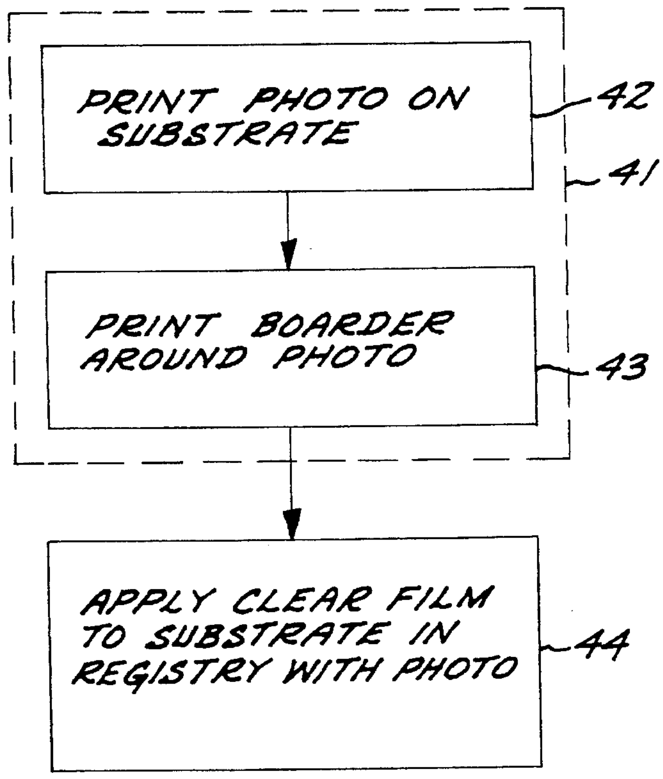
FIG. 4 is a block diagram flow sheet illustrating the steps of the method of the invention which are used to manufacture the products and FIGS. 1–3.

FIG. 4 depicts the method for manufacturing the product of FIGS. 1–3. As indicated by the dashed lines 41, the steps of printing the photograph 42 and printing the border 43 may be combined or sequentially reversed. After completing these steps the clear film 14 is applied 44 to the substrate 11.

Having described by invention in such terms as to enable those skilled in the art to understand and practice it and having identified the presently preferred mode of practicing my invention, I claim:

1. A method for manufacturing a lithographically printed book which visually simulates a conventional photograph adhesively secured to a portion of a book page bearing printed words, comprising:

lithographically printing upon a surface of said book page a photographic print on a first portion of an opaque substrate which also carries printed words on a second portion thereof;

printing a border on said opaque substrate around said print between said photographic print and said words; and applying a transparent film only on said first portion of said opaque substrate in registry with said print and said border.

* * * * *